April 29, 1969     A. G. PATCHELL ET AL     3,441,638
PROCESS FOR MAKING AN OPEN NETWORK STRUCTURE
Filed Nov. 19, 1965
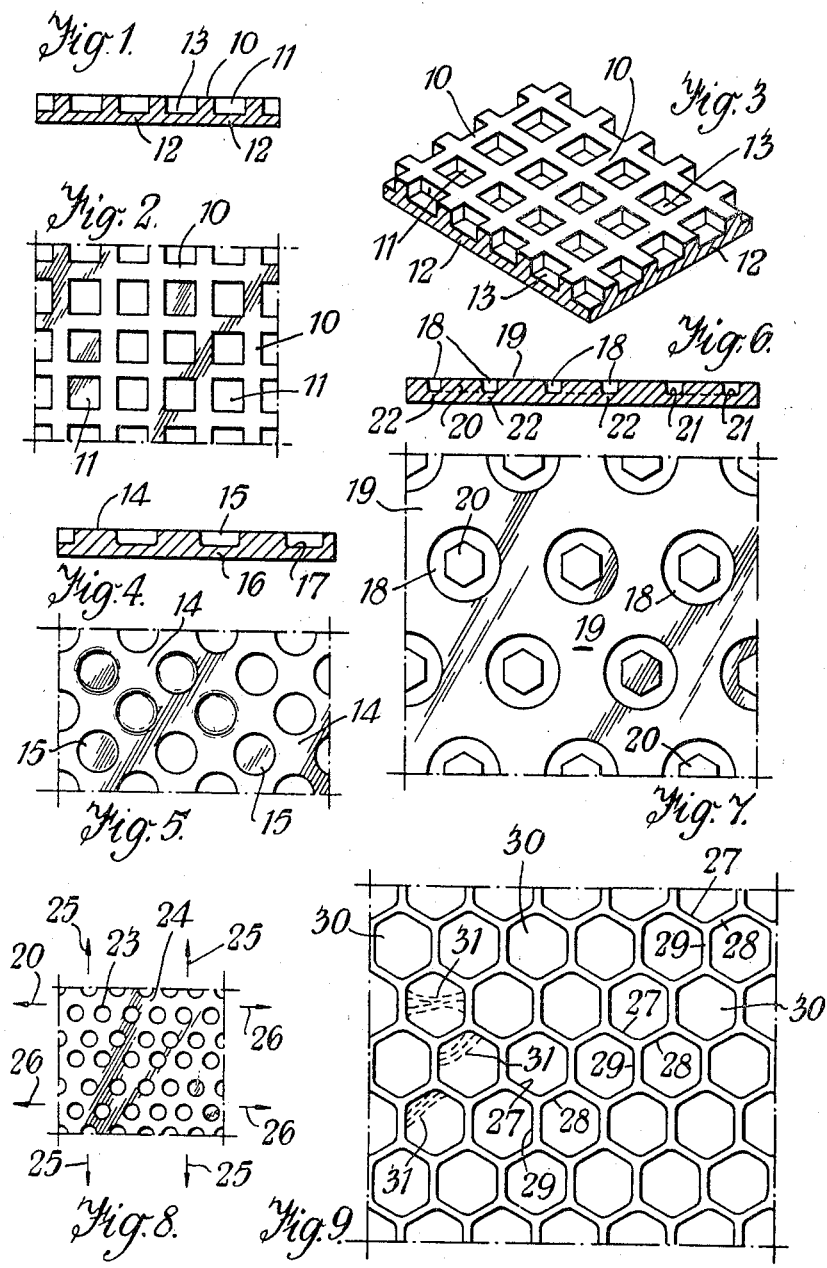

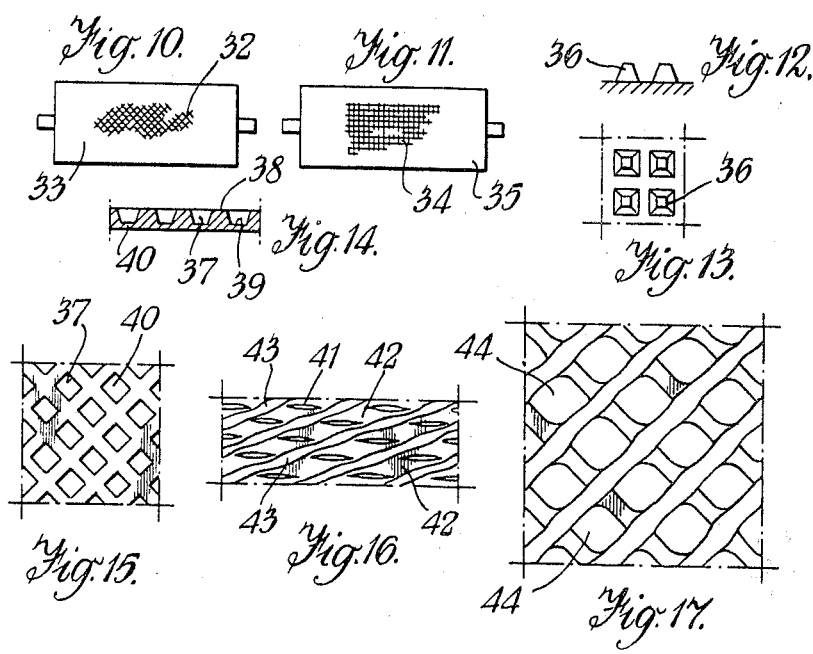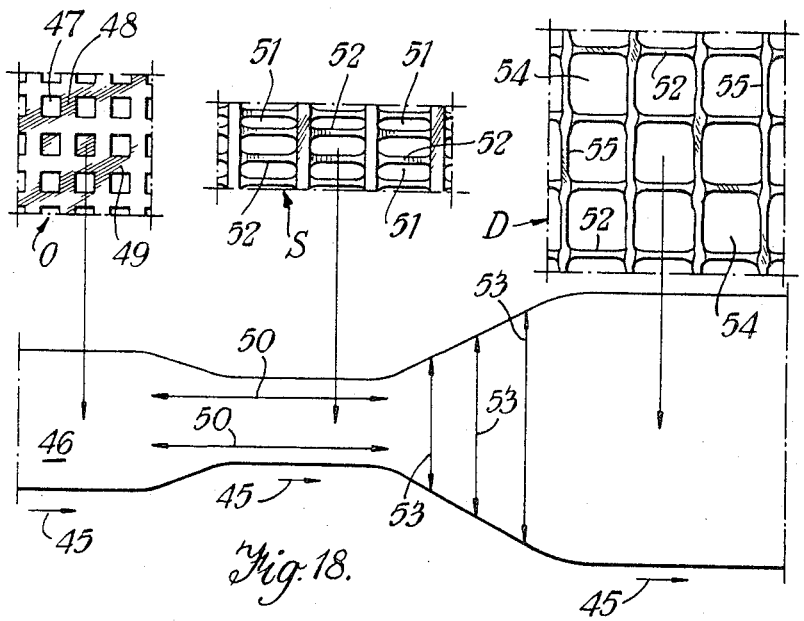

United States Patent Office 3,441,638
Patented Apr. 29, 1969

3,441,638
PROCESS FOR MAKING AN OPEN NETWORK STRUCTURE
Albert George Patchell, Welwyn Garden City, Ronald Lloyd, Sawbridgeworth, and Arthur Ripon Stephenson, Skidby, England, assignors to T. J. Smith & Nephew Limited, Hull, Yorkshire, England, a British company
Filed Nov. 19, 1965, Ser. No. 508,644
Claims priority, application Great Britain, Nov. 20, 1964, 47,397/64
Int. Cl. B29f 5/00; B29c 17/02
U.S. Cl. 264—154                                     12 Claims

ABSTRACT OF THE DISCLOSURE

An open network structure is produced by biaxially stretching a sheet of thermoplasic material having a plurality of non-connected depressions which are convergent downwardly from the open outer end, said stretching being sufficient to split the material below said depressions.

---

The present invention relates to open network structures of thermoplasic polymers which are capable of taking a degree of permanent set when stretched to a sufficient extent and to a process for the preparation of such structures.

The invention relates more particularly to open network structures, formed from sheets of such thermoplastic materials which have a thickness within the range of about 0.002" up to about 0.25".

In general, the invention has for its object to provide such sheets as an open network structure, of desired configuration, and a simple and efficient process for their preparation.

It has previously been proposed to produce open network structures from films of certain thermoplastic materials with one surface at least formed as an embossed surface of small solid bosses in longitudinal and transverse rows, by first stretching the embossed film at a desired rate in one direction, termed the longitudinal direction, and then subjecting the stretched film to a stretching which is transverse to the first stretching, which spilts the film with a multiplicity of short splits through the material thereof, to leave a net-like structure in which each boss has thinned narrow bands extending therefrom to the adjacent bosses of the adjacent longitudinal rows when the material is expanded; in this case the longitudinal stretching and the transverse stretching take place in succession. However, it has also been proposed for such longitudinal and transverse stretching or stressing to take place simultaneously to produce open network structures.

It has also been proposed to provide films of thermoplastic material with cuts and to stretch such films in one or two directions to open out such cuts to form openwork structures, and still further it has been proposed to form films of thermoplastic material with perforations and to stretch such films in one or two directions to open-out such perforations to form openwork structures.

According to the present invention, thermoplastic material in sheet form, such as set forth in the first paragraph hereof, has one surface at least formed with a plurality of small non-connecting depressions or recesses therein which extend partly through the thickness of the sheet, to leave thinned portions of the sheet at the bases of the depressions, and such material is subjected to stretching in two distinct directions, for example mutually at right angles, which can be either in succession or simultaneous, to cause the material to take a degree of permanent set in an expanded state, with elongation and attenuation of the various parts of the full-thickness portions of the sheet, and to split, in various positions or zones, the expanded and still further thinned material at the bases of the depressions, to leave the depressions, or parts thereof, as openings.

The thermoplastic polymers from which open network structures in accordance with the present invention can be made are, for example, polymers of the olefin group including ethylene and propylene, and copolymers thereof in any suitable blend as, for example, high-density or medium-density linear polyethylene and ethylene-propylene copolymer and some of the polyesters.

The sheet-form material may in some cases be a composite sheet, for example a laminate of two different thermoplastic materials such as high-density polyethylene and low-density polyethylene.

The stretching in two distinct directions, in accordance with the invention, must be defined as including actual stretching or orientation in one direction and either an actual stretching or orientation in the other direction; or an "opening out" of the material from the condition of its first stretching or orientation, in the other direction, or without actually further stretching or orientating the material which has been stretched or orientated in one direction, subjecting this stretched and orientated material to a tension stress in the other direction, for example by holding it from narrowing or contracting, whilst it is being subjected to its initial stretching or orientation.

The final degree of stretch given to the material in one or the other direction is subject to many variations and will depend, amongst other factors, on the material used and the temperature employed in the stretching process. Thus, the stretch in one direction may be any percentage up to 500% or even more. The stretch in the other direction may similarly by any percentage up to 500% or even more and can differ within this range from the percentage stretch of the first direction.

Still further, as above set forth, the percentage of stretch in the second direction will be relatively small when due to tension stress caused by holding the material from any or part of the narrowing or contracting whilst it is being subjected to the first stretching or orientation.

The depressions in the surface or surfaces of the material may be of any suitable shape or shapes, which include circular, elliptical or polygonal, preferably regular. For instance, they may be triangular, square, pentagonal, hexagonal, heptagonal, or octagonal, with reentrant portions in some cases to form star shapes, or otherwise. In most cases, however, they are preferably square, diamond shape, rectangular, hexagonal, elliptical or circular. Where required, various constructions of depression shapes may be on the same film surface.

In most cases they will be somewhat convergent downwardly from the open outer end, and their actual bases may be concavely curved, or pointed or stepped. Furthermore, they may in certain instances be annular in plan, that is, each depression may be an endless "trench" or "moat" which surrounds a more or less central "island" having a desired thickness, which may be the full thickness of the sheet.

Although not limited thereto, the depressions may be arranged in rows at desired spacing between the rows, and adjacent rows may have their depressions in staggered relation.

The dimensions across the full width of a depression prior to stretching may be equal to, more or less than the dimension (in the same direction) of the solid material between two adjacent depressions. Moreover, the diameter (or corresponding dimension) of a depression at its open end, may be relatively small, for example 0.015" (or less), or relatively large, for example 0.25" (or more), or it may be anything between 0.015" and 0.25".

In many cases the openings in the network structures formed by the method of the present invention will have various arrangements of bands interconnecting portions of the material across the openings. These can be melted to merge with the main solid material and to clear the openings, by a flaming treatment or by blowing thereon with a hot gas, for example air.

This flaming or blowing with a jet of hot air or other inert gas, may be applied to the material while it is carried by and turning with a driven hollow metal cylinder, so that the material passes a heating zone where the tip of a flame or row of flames or a jet of hot gas is applied for a small fraction of a second to the successive portions of the material as they pass through the said zone.

The exact configuration of the open network structure made by the method of the invention, will depend upon many factors, including the mechanical properties of the material, the arrangement and shapes of the depressions, the arrangement and general interconnection of the unbroken portions of full thickness, and the particular method and sequence of the stretching and stressing.

In order that the invention may be better understood, it will now be described with reference to the accompanying diagrammatic drawings which are given by way of example only and in which:

FIG. 1 is a cross-sectional elevation, to an enlarged scale, of a portion of a sheet of suitable thermoplastic material having a uniform arrangement of cavities in one surface thereof, suitable for use in carrying the present invention into effect.

FIG. 2 is a plan of FIG. 1, and FIG. 3 is an isometric view of the portion of material shown in FIGS. 1 and 2.

FIG. 4 is a similar view to FIG. 1, of another portion of a sheet of thermoplastic material, with cavities in one surface thereof, for carrying the present invention into effect.

FIG. 5 is a plan of FIG. 4.

FIG. 6 is a similar view to FIGS. 1 to 4, of another portion of a sheet of thermoplastic material with cavities in one surface thereof, suitable for the purposes of the present invention.

FIG. 7 is a plan of FIG. 6.

FIG. 8 is a plan of a portion of a sheet of suitable thermoplastic material, having cavities in one surface, for use in the method according to the invention, and FIG. 9 is a plan of the portion of sheet material shown in FIG. 8 after it has been biaxially stretched 150% in each direction, and which is in accordance with the method of the present invention.

FIG. 10 is a diagrammatic elevation, to a small scale, of one form of embossing roller suitable for forming depressions in one surface of a sheet of thermoplastic material, for the purposes of the present invention.

FIG. 11 is a similar view to FIG. 10, but of a slightly different form of roller for the same purpose.

FIG. 12 is a fragmentary, highly enlarged sectional elevation of a portion of the surface of the roller shown in FIG. 11.

FIG. 13 is a plan of the portion of the roller shown in FIG. 12.

FIG. 14 is a sectional elevation, to a highly enlarged scale, of a portion of a sheet of thermoplastic material with depressions in one surface such as would be formed by rollers as shown in FIGS. 10 and 11.

FIG. 15 is a plan of a portion of a sheet of thermoplastic material with depressions in one surface, such as would be produced by the roller illustrated in FIG. 10.

FIG. 16 shows the material of FIG. 15, after it has been subjected to uniaxial stretching or orientation in one direction to produce a degree of permanent set in the material.

FIG. 17 shows the material of FIG. 16 when "opened out," stentered or stretched, in a direction at right angles to the stretching of FIG. 16, to produce a degree of permanent set in the material and form an open network structure in accordance with the present invention.

FIG. 18 is a diagrammatic plan of a continuous sheet of thermoplastic material undergoing a process according to the present invention, to produce an open network structure in accordance with the invention, the diagram including highly enlarged sub-diagrams or views of portions of the material of the sheet, in three different stages of the process.

For convenience of illustration, the thicknesses of the materials shown in the drawings, in relation to the other dimensions, have been exaggerated.

In FIGS. 1, 2 and 3, the sheet thermoplastic material has one surface, 10, formed with uniform square-shaped depressions 11 arranged in uniform parallel rows, which depressions extend, as will be clear from the drawings, only partly through the sheet to leave thinned portions 12 immediately below the bases 13 of the depressions.

Thus, in all positions, the material which bounds the depressions 11, is of the full thickness of the sheet and has a continuous and interconnected area on the surface 10, whilst the material immediately below the depressions 11 has only a fraction, which can be a small fraction, of the full thickness of the sheet.

As shown in FIGS. 4 and 5, the upper surface 14 of the sheet has similar depressions 15 of circular shape arranged in staggered rows, and which depressions extend only partly through the sheet to leave thinned portions 16 immediately beneath the bases 17 of the depressions. The arrangement and spacing of the rows of depressions further is such, as will be seen, that the diagonally crossing inclined rows of depressions give a square pattern.

In FIGS. 6 and 7 the sheet has circular depressions 18 in its upper surface 19, which are arranged in staggered rows, each depression having in the centre an upstanding "island" 20 of hexagon shape. Each depression as a consequence is annular in plan, and immediately below the ringlike base 21 the material of the sheet is thinned at 22.

What may be called the crossing diagonal rows of depressions have an included angle of 60° so that the surface of the sheet presents a somewhat hexagonal pattern.

The sheet material shown in plan in FIG. 8 has circular depressions 23 in its upper surface 24. These depressions leave thinned portions of the sheet immediately beneath their bases, as in the previous cases.

According to the present invention, thermoplastic material in sheet form, with one surface at least formed with small depressions, as hereinbefore generally described and for example such as set forth in FIGS. 1 to 8, is subjected to biaxial stretching as hereinbefore defined.

This biaxial stretching and stressing may be effected in any known manner and it is not necessary that it should be particularly described herein.

In some cases, an instance of which will be given hereinafter, a uniaxial stretching or orientation in one direction, which causes the thinned portion of the material to split in various more or less uniformly located positions, may be "opened out," that is, stretched in a direction transverse to the original orientation, in a manner resembling stentering as utilised in certain textile operations.

In relation to FIG. 8, the biaxial stretching and stressing is represented by the arrows 25 for stretch in one direction, and the arrows 26 for stretch in the other direction.

After this biaxial stretching and stressing, to the extent of 150% of the original dimensions of FIG. 8, the open network structure approximating to that shown in FIG. 9, is formed from the sheet shown in FIG. 8.

The material has taken a degree of permanent set and in addition to the elongation and attenuation of the various full-thickness parts of the sheet, shown in FIG. 9 and represented by the continuous and connected stretched portions 27, 28 and 29, the portions of thinned material at the bases of the depressions have been still further thinned and split in various positions or zones and merged into the stretched portions 27, 28 and 29, to leave openings 30 bounded by the stretched portions 27, 28 and 29 and which constitute the openings of the network structure.

In an example of carrying the invention into effect as shown in FIGS. 8 and 9, the thermoplastic material, for example polyethylene, may be of 0.007" gauge, and the diameter of the depressions may be as small as 0.020", and these depressions may be arranged in rows of twenty-five to the linear inch with the centres 0.040" apart, that is to say, there are approximately 625 depressions to the square inch. When stretched 150% in the two directions, there results an open network structure having approximately 100 openings, uniformly arranged, to the square inch. It is, of course, obvious that the dimensions of the various parts could be smaller or larger, for instance when the material is sufficiently thick, the distance between the centres of the depressions could be 0.50" prior to stretching.

Whatever the size, but especially when small originally, in place of clear openings such as 30, FIG. 9, there may be in some or all of the openings, various arrangements of strands or fine fibres of the plastic material, such as indicated in dotted lines by 31 in a few positions of FIG. 9, interconnecting the material of some of the portions 27, 28 and 29.

As before indicated herein, the exact network produced will depend, amongst other factors, on the starting material, the shape and ararngement of the cavities, and the relative degrees of stretch and timing of the two stretches.

For instance, instead of a hexagon formation of net shown in FIG. 9, produced from the material of FIG. 8, if the sheet of FIG. 5 were biaxially stretched a squared pattern of network would result, whilst from the sheet shown in FIGS. 6 and 7 the net arrangement would resemble FIG. 9 but having in the centres of the openings such as 30, islands or bosses of the thermoplastic material, connected by various strands of stretched material to the surrounding boundary of the net opening. That is to say, each opening of the main network would itself be an open network of more or less radially arranged strands from a central boss in the opening.

Although not limited thereto, in practical methods of carrying the invention into effect the depressions in the surface of the material will be formed by embossing rollers.

These embossing rollers may be made by a similar process to that used for the manufacture of inking rolls for the printing trade. In this there is first produced by a hand or machine engraver, a master tool which is used to emboss a desired pattern on the roll to be used for inking.

In the present case the master tool produces the embossments on the embossing roller which is to be used for forming the cavities in the thermoplastic material.

In other cases the embossing rollers may be produced by an etching process.

In still further instances, the embossing rollers may have spaced-apart truncated square pyramidal projections on their operative surfaces, such as shown enlarged in FIGS. 12 and 13. These may be of small size, for example some 20 to 30 to the linear inch, and are produced by a multiple rotary milling operation, by a cutting milling tool resembling a "knurling" roller.

The tool is first set up to cut parallel grooves in one direction, and then the set-up is changed to cut grooves in another direction so that the rows of spaced-apart truncated pyramids are left on the surface of the roller.

In the arrangement shown in FIG. 10, the rows of pyramids cross in a diagonal arrangement indicated by the crossing lines 32 on the embossing roller 33. FIG. 11 shows another ararngement, where the rows of pyramids are arranged in the axial and circumferential directions and cross in lines 34 on the embossing roller 35.

With most constructional forms the truncated pyramids 36 are of the shape shown enlarged in FIGS. 12 and 13. The spacing between the pyramids of a row may vary, but those shown, when arranged according to FIG. 10, produce diagonally arranged depressions 37 such as shown in FIG. 15.

The material shown in cross section in FIG. 14 has these depressions 37 in the upper surface 38, which depressions have bases 39 to leave portions 40 of thinned material immediately beneath said bases. As before mentioned, the full thickness of the material is in the range 0.002" to 0.25" and, although not limited thereto, the thickness of the thinned portions such as 40, before stretching, could be in the range of 0.0005" to 0.010" or more.

FIG. 16 shows in general the arrangement of "splits" produced in the material when the latter is such as that shown in FIGS. 14 and 15, which splits are obtained by uniaxially orientating the material in the direction of its length, and FIG. 17 shows the general type of open network obtained by "opening-up" or stretching by stentering the split material of FIG. 16.

Particularly in FIG. 16 it should be noted that the uniaxial orientation of the thinned portions 40 and results in the splits 41 bounded by bands 42 stretched from part of the diagonal structure, whilst the continued diagonals 43 represent the other parts of the diagonal structure; when opened out (FIG. 17), the splits 41 are expanded into and form the openings 44 of the net.

The lower part of FIG. 18 is a diagram of the thermoplastic material passing through a machine, from left to right in the direction of the arrows 45, in a continuous process to produce openwork structures in accordance with the invention. The portion 46 of the material with the depressions in one surface is the starting material and it is being drawn off a bulk supply roller (not shown) in any usual manner.

The material on its upper surface has depressions from a roller such as shown in FIG. 11, and the sub-diagram O at the top left-hand corner of FIG. 18 shows to a greatly enlarged scale the material with the depressions. This material has the thinned portions 47 immediately below the bases of the depressions and these are bounded by the vertical continuous portions 48 of full thickness and the horizontal continuous portions 49, also of full thickness.

The arrows 50 represent the first, that is, the longitudinal stretch. This not only elongates the material generally, but also narrows it, and the sub-diagram S above this narrowed part shows to a greatly enlarged scale the material with the thinned portions 47 at the bases of the depressions, stretched and opened into splits 51, whilst the vertical portions 48 of full thickness are shown further apart, and the horizontal portions 49 of full thickness are stretched and attenuated into thinned bars 52 connected to the vertical portions 48 and bounding the splits 51.

The arrows 53 represent the second, that is, the transverse stretching, which expands the narrowed material of sub-diagram S, causing its edges to diverge in a stentering manner. The sub-diagram D above this expanded part, shows to a greatly enlarged scale the material from the sub-diagram S expanded, so that the narrow splits 51 are changed into the openings 54 of the network, the vertical members 48 stretched into narrow bounding bars 55, and the bars 52 spaced further apart.

In this manner the example of an open network structure in accordance with one embodiment of the invention illustrated by the sub-diagram D, is produced in accordance with the invention.

Networks in accordance with the invention generally and such as set forth in FIGS. 15 to 17 and FIG. 18, can be produced at room temperature.

However, according to the particular thermoplastic material and the thickness of the material being treated, the temperature of stretching may be raised to 75° C. or higher. This can be accomplished in any usual manner, for example, by incorporating heater sections in the machine, which open into shielded or guarded spaces through which the material passes and wherein heated currents of air may be directed to one or both surfaces of the material which is passing along to be treated or which is actually under treatment.

The thermoplastic sheet material with the depressions may be made up in any suitable manner. For example, the thermoplastic material, whilst in the process of formation into a sheet by extrusion and cold drawings, may pass between two rollers, one of which has an outer surface with projections of appropriate shape and spacing as herein before described.

In another construction the thermoplastic sheet in process of formation may pass on to the surface of a travelling endless or other band of steel or other material or materials, having projections thereon to mould the depressions into the surface of the thermoplastic sheet, with or without the aid of suitably applied pressure, so that when the sheet material is stripped from the band it will have the depressions on one surface thereof.

The thermoplastic sheet material may have depressions on each of its two surfaces. Preferably, in this case, these depressions are of the same shape and arranged in axial alignment on each surface. In any case, there are thinned portions or what may be termed diaphragms of the material, at the bases of the axially aligned depressions, which are stretched and split when undergoing the process of the invention, to form a start to the formation of the apertures or openings of the network structure.

When the thermoplastic sheet material is a laminate, there are many advantages. For instance, a membrane formed by an outer lamination is disposed at the base of a recess and can be of a chosen polymer which propagates "splits" most easily. The major portion of the film can be chosen for cheapness, strength, heat-sealability, or other properties, and this is the lamination which has the depressions therein and therethrough. Laminates can be made during the extrusion/embossing process or other process, or even prelaminated materials may be used and passed through heated embossing rollers.

The thermoplastic material can, if desired, include a suitable proportion of fillers and/or colouring matter, as well as stabilisers and otherwise, to produce the open network sheet structure, it, however, being understood that only such additions and quantities thereof can be employed which will be compatible with the carrying of the process of the invention into effect.

The open network construction of thermoplastic material made in accordance with the invention, preferably while subjected to a heat treatment, may be further submitted to another stretching in two directions, preferably simultaneously applied, to still further open-out the structure.

It should be understood that the present invention includes not only the various methods herein described but also the finished products themselves whenever formed by the said methods.

The invention is not limited to the precise forms or details herein set forth, as these may be varied to suit particular requirements.

What we claim is:

1. A method of producing an open network structure from a sheet of imperforate thermoplastic material selected from the group consisting of polyolefins, ethylene-propylene coplymers and polyesters, comprising the steps of applying biaxial stretching forces to a sheet of said material which has at least one side thereof provided with a plurality of non-connected depressions which are convergent downwardly from the open outer end extending partly through the thickness of the sheet so as to leave thinned portions of the sheet immediately below the bottoms of the depressions, and continuing the application of such stretching forces until a permanent set is imparted to the material with the thick portions of the sheet bounding the depressions being elongated and attenuated and said thinned portions below the depressions being further thinned and ultimately split to form the openings of a network structure.

2. The method as set forth in claim 1, including the step of supplying said sheet in the form of an integral portion of a continuous web of said sheet material fed from a source of supply to a take-up means.

3. The method as set forth in claim 1, in which said biaxial stretching forces are applied to a sheet which has said depressions in both sides thereof and axially aligned in pairs.

4. The method as set forth in claim 1, in which said biaxial stretching forces are applied to a sheet which comprises a laminate structure.

5. The method as set forth in claim 1, in which said biaxial stretching forces are applied to a sheet in which the initial thickness of said thick portions is 0.002″ to 0.25″.

6. The method as set forth in claim 5, in which said biaxial stretching forces are applied to a sheet in which the initial thickness of said thinned portions is 0.0005″ to 0.01″.

7. The method as set forth in claim 1, in which said biaxial stretching forces are applied to a sheet in which the linear spacing between centers of the depressions is 0.020″ to 0.5″.

8. The method as set forth in claim 1, in which said biaxial stretching forces are applied to a sheet in which the area of each said depression at the open end thereof is 0.0004 to 0.0625 of a square inch.

9. The method as set forth in claim 1, in which said biaxial stretching forces are applied to a sheet in which each said depression is of truncated pyramidal form.

10. The method as set forth in claim 9, in which said biaxial stretching forces are applied to a sheet in which said depressions are arranged at uniform spacings in diagonally crossing rows.

11. The method as set forth in claim 9, in which said biaxial stretching forces are applied to a sheet in which said depressions are arranged at uniform spacings in crossing longitudinal and transverse rows.

12. The method as set forth in claim 1, in which said biaxial stretching forces are applied at a temperature of at least 75° C.

References Cited

UNITED STATES PATENTS 3,137,746   6/1964   Seymour et al. _____ 264—289

JULIUS FROME, *Primary Examiner.*

HERBERT MINTZ, *Assistant Examiner.*

U.S. Cl. X.R.

161—109; 264—289